INVENTORS
GEORGE H. HERRICK
RICHARD H. PRESCOTT
JOHN C. MOERK
BY

United States Patent Office 2,964,660
Patented Dec. 13, 1960

2,964,660
SUBMERSIBLE DYNAMOELECTRIC MACHINE

George H. Herrick, Beloit, Wis., and Richard H. Prescott, South Beloit, and John C. Moerk, Freeport, Ill., assignors to Fairbanks, Morse & Co., Chicago, Ill., a corporation of Illinois Filed Sept. 8, 1958, Ser. No. 759,654

9 Claims. (Cl. 310—87)

This invention relates to submersible electrical machines, and has particular reference to a dynamoelectric machine provided for operation in submerged condition in a body of liquid, with admission and circulation of the liquid in and through the machine.

The principal object of the invention is to afford an improved dynamoelectric machine adapted for operation submerged in liquid such, for example, as fresh or sea water, and in operative or driving association with apparatus, or means to be operated thereby and wherein the machine is of open construction adapted for the admission and circulation of the ambient submersing liquid in and through the machine in contact with all parts thereof.

Another object is to afford a submersible dynamoelectric machine open for circulation therethrough of liquid admitted from the ambient liquid body in which the machine is submerged, providing a tubular casing open at its ends and having an annular stator therein, and a shaft mounted rotor cooperating with the stator to form an annular gap therebetween, wherein the machine includes shaft operated pumping means for effecting pressure flow of liquid in and along the gap and assisting liquid circulation through the machine.

Another object is to provide a submersible dynamoelectric machine of the character aforesaid, having cooperating stator and rotor elements with the rotor element mounted on a shaft having opposite end portions extending axially beyond the rotor element, and providing both radial and axial thrust bearings at each shaft end portion, with the bearings lubricated by the liquid in circulation in the machine.

The foregoing and other objects and advantages of the present invention will appear from the following description of a presently preferred embodiment illustrated in the accompanying drawings, wherein.

Figure 1:
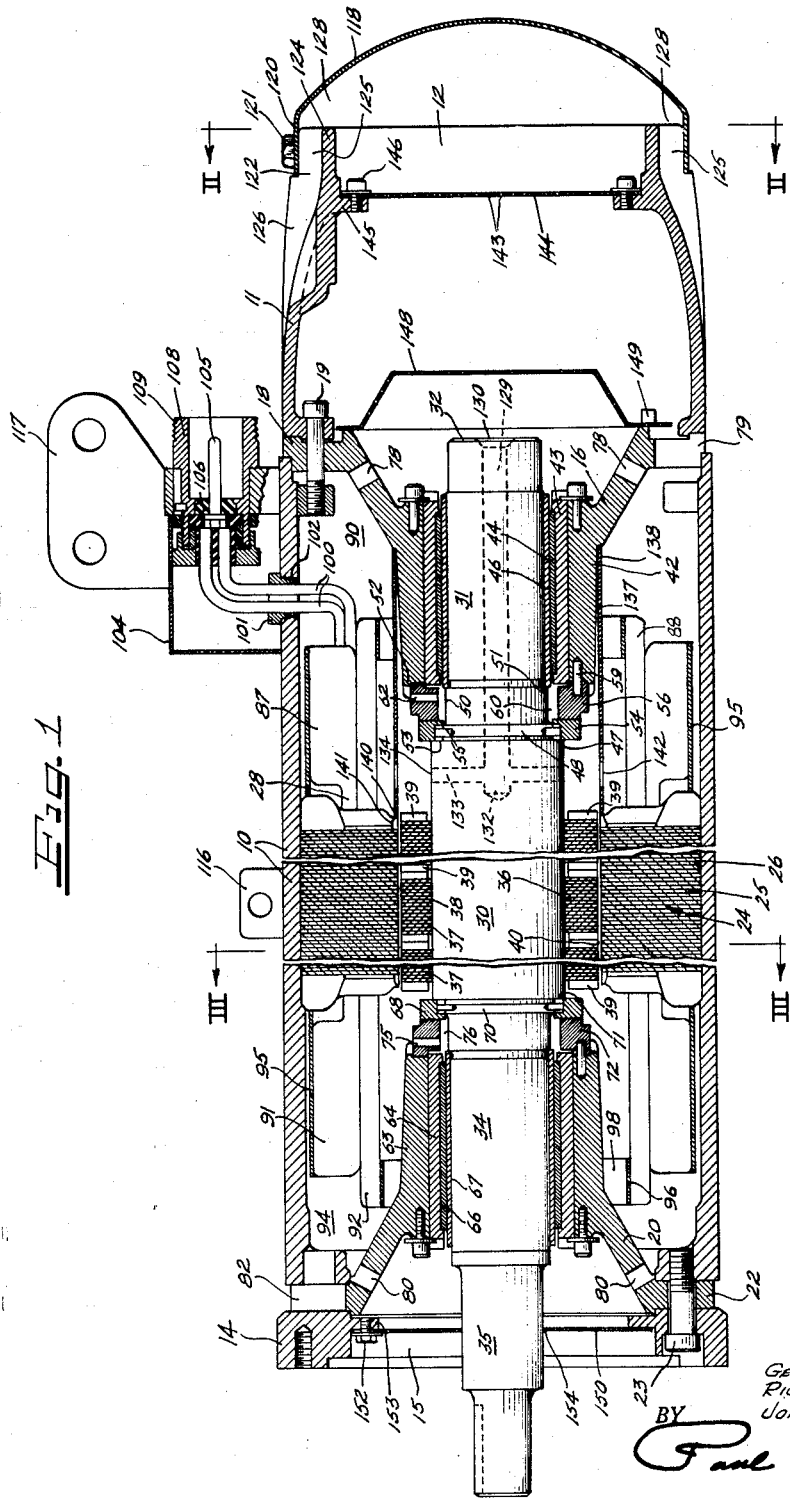
Fig. 1 is a sectional elevation longitudinally through the dynamoelectric machine of the present invention.

The submersible machine of the present invention is provided for operation submerged in a body of liquid with the liquid flooding the machine interior and in circulation therethrough during its operation. It is particularly suitable for submergence in sea water, although in no wise limited thereto. Also, the several parts and elements of the machine are constructed and provided of suitable materials which are non-corrosive or corrosive-resistant to the liquid in which the machine is to be submerged.

Referring to the drawings, the machine having its frame parts formed of suitable corrosion-resistant material as bronze-alloy or the like, provides a casing open at its ends and comprising an elongate tubular casing member 10 having at one end a casing extension 11 affording the casing end opening 12, and at its opposite end a relatively shorter casing extension 14 affording the opposite casing end opening 15. A bearing support 16 has its mounting flange 18 extending between the casing member 10 and extension 11, with assembly securement of the casing parts and bearing support by suitable bolting as indicated by bolt 19. Similarly, a bearing support 20 has its mounting flange 22 extending between the casing member 10 and extension 14, with assembly securement of the parts by bolting, as at 23. Casing extension 14 is adapted for connection to the frame of the device (not shown) to be operatively associated with or driven by the machine.

Figure 3:
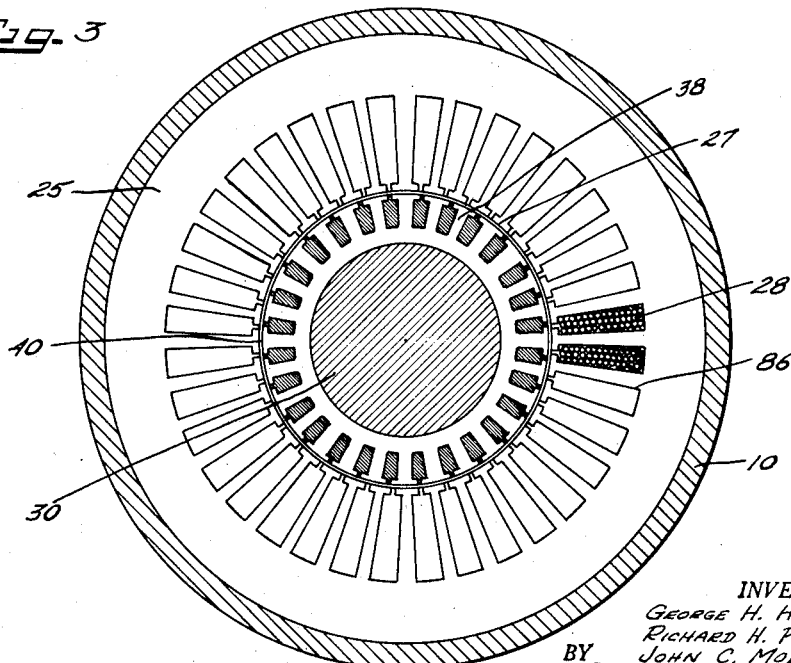
Fig. 3 is another enlarged transverse section, as taken along line 3—3 in Fig. 1.

Suitably secured in mounted position substantially centrally in casing 10, is a stator assembly 24 including an annular slotted magnetic core 25 preferably of laminated construction, having its outer surface 26 in core-seated engagement with the casing member and presenting an inner cylindrical core surface 27 (Fig. 3). The stator core slots carry suitable field windings 28 more particularly referred to hereinafter.

Extending longitudinally in the casing and axially thereof, is a rotor shaft 30 which has one end portion 31 terminating in a transverse end face 32 in a zone near the inner end of casing extension 11. The shaft has its opposite end portion 34 extended by the shaft portion 35 projecting outwardly of the casing through casing extension 14, shaft portion 35 affording connection with the apparatus or device (not shown) to be operatively associated with or driven by the present machine. Mounted on the shaft between its end portions, is a rotor assembly 36 for cooperation with the stator assembly. While the present dynamoelectric machine may be of any suitable or desired type, for convenience and by way of present example, the machine is shown as an induction type motor. Accordingly, the rotor assembly here is an induction rotor which, by preference, comprises a plurality of annular rotor sections 37 in end-to-end abutment, the sections being of so-called squirrel cage type and each comprising a laminated magnetic rotor core 38 having induction windings of desired conducting material, as copper for example. While the rotor windings may be provided in any suitable manner, they are here cast to the core and provide opposite integral end rings 39. The rotor sections which are keyed or otherwise secured on the shaft, have the outer surface thereof cooperating with the stator core inner surface 27 to form an annular motor gap 40 therebetween.

Rotatably supporting the rotor shaft 30 are bearing means located on opposite sides of the motor rotor assembly and carried by the bearing supports 16 and 20. Describing first the bearing means in relation to support 16, the latter provides an integral generally cylindrical bearing housing 42. Suitably mounted in the housing is a bearing shell 43 carrying a sleeve bearing element 44 engaging a bearing sleeve 46 fixed on and rotatable with shaft portion 31. This bearing affording radial support of the shaft, is adapted for liquid lubrication and cooling by the liquid (which may be sea water as herein indicated) flooding and in circulation in and through the motor, as will be more particularly described hereinafter. Although not here shown, bearing element 44 may be provided with liquid channels or grooving in its bearing face, as to facilitate bearing lubrication. Shaft 30 provides an annular shoulder 47 inwardly spaced from shaft portion 31, and is stepped to afford an annular seat 48 adjacent the shoulder, and a further reduced portion 50 terminating in a shoulder 51 abutted by the radial bearing shaft sleeve 46. Between shaft shoulder 47 and the facing end 52 of bearing housing 42, is a thrust bearing assembly including a bearing element or ring 54 on shaft seat 48 and against shoulder 47. Ring 54 is keyed to the shaft for rotation therewith, as by suitable key or pin elements 55 projecting from the shaft seat into slots or recesses 53 in the inner periphery of the ring. Engaging the shaft rotated thrust ring 54 is the stationary thrust bearing element 56, also of ring form, which is carried on bearing housing 42 at its end 52, preferably being connected to the housing end as by pins or dowels one of which is shown at 59. As appears, the bearing element 56 overlies the shaft reduced portion 50 and forms therewith an annular liquid flow passage 60 extending beneath the contacting surfaces of thrust bearing elements 54 and 56 and open to the adjacent end zone of the engaged radial bearing elements 44 and 46. Also, bearing ring 56 is provided with radial liquid passages 62 open at the exterior thereof and communicating with the passage 60.

The radial and axial thrust bearings associated with the opposite bearing support 20 may be and preferably are identical with those described above. Thus, the support has a housing 63 containing bearing shell 64 and radial sleeve bearing 66, the latter engaging the bearing sleeve 67 on shaft end portion 34. Similarly, the axial thrust bearing comprises thrust bearing ring 68 on shaft seat 70 and against shaft shoulder 71, and stationary thrust ring 72 carried on the adjacent end of the support housing 63. Likewise, the thrust bearing arrangement includes radial passages 75 in ring 72, communicating with the annular shaft passage 76.

Further with regard to the bearing assemblies, the bearing support 16 is provided with a plurality of liquid circulation openings or passages 78 therethrough, while its flange 18 is relieved or cut-away in one or more portions to afford liquid passage means 79 open both to the casing exterior and interior and serving as drain passages in removal of the motor from its submergence in a body of liquid. Similarly, the opposite bearing support 20 has circulation passages 80, and drain passage means 82 in its flange 22.

In the motor stator assembly, the field windings 28 extend longitudinally of the stator core 25 in the core slots 86 (Fig. 3), and afford clearances therein sufficient for the passage of liquid through the slots. These windings have end turns arranged in end-turn groups 87 and 88 disposed in the casing space 90 between the stator core and the bearing support 16, and opposite end-turn groups 91 and 92 in the casing space 94 between the stator core and the opposite bearing support 20. Each of the end-turn groups 87 and 91 is embraced by a shield member 95 of suitable, preferably semi-rigid pliable insulating material which is not deleteriously affected by liquids such as sea water, in which the motor is to be submerged. Members 95 serve to space the end-turn group 87 and 91 from the overlying casing. Moreover, secured to the end-turn group 92 on the underside thereof, is an annular ring 96 which may be of a material similar to that of member 95. Ring 96 which serves primarily as a liquid-circulation baffle, is uniformly radially spaced from the outer surface portion of bearing housing 63 to form therewith an annular liquid-circulation passage 98. The field windings 28 having the end turns as above described, are formed from suitable gauge conductor wire which is sheathed by insulation impervious to liquids, particularly sea water, in which the motor is intended for submergence. Such insulation, may be, for example, a covering or coating of pliable, highly dielectric polyvinyl chloride composition or other material having like characteristics including corrosion resistance to sea water as well as to atmospheric conditions when exposed to the open air.

While the machine of this invention may be a single or multi-phase alternating current type, in the present example it is a three-phase induction motor having three field winding leads extending laterally through the casing to individual terminal assemblies externally on the casing. Since the leads and terminals are alike, only one thereof is here illustrated. As shown, the field winding lead 100 (which may comprise one or more wires) is extended laterally of the casing member 10 and outwardly thereof through an insulating grommet 101 in a casing opening 102, into its terminal housing 104 which is in securement externally on the casing. The lead 100 is connected with a terminal element 105 carried in an insulating and supporting structure 106 which is liquid-sealed and carried by the housing forming one wall thereof. Such structure includes a socket-like extension 108 having an outer externally threaded end 109 and in which the terminal element 105 is exposed. The socket extension 108 is provided to receive in liquid-tight threaded connection at its threaded end 109, one end of a power supply cable (not shown) having a mating connector socket for receiving the terminal 105. The other two housing and terminal assemblies (not shown) are located in relative adjacence to the assembly above described, for convenience of three-phase power supply cable connections thereto.

Mounted externally on casing member 10 and substantially at the center of gravity of the complete motor unit, is a lug 116 for a suspension and lifting cable (not shown). A second and larger lug 117 is secured externally on casing member at the end thereof adjacent casing extension 11, the latter constituting the forward or head end of the motor unit in respect of motor displacement in the body of liquid in which it is submerged, and in respect to liquid-circulation through the motor as will presently appear. Lug 117 provides a connection for a further suspension and lifting cable and a pull cable (both not shown).

Figure 2:
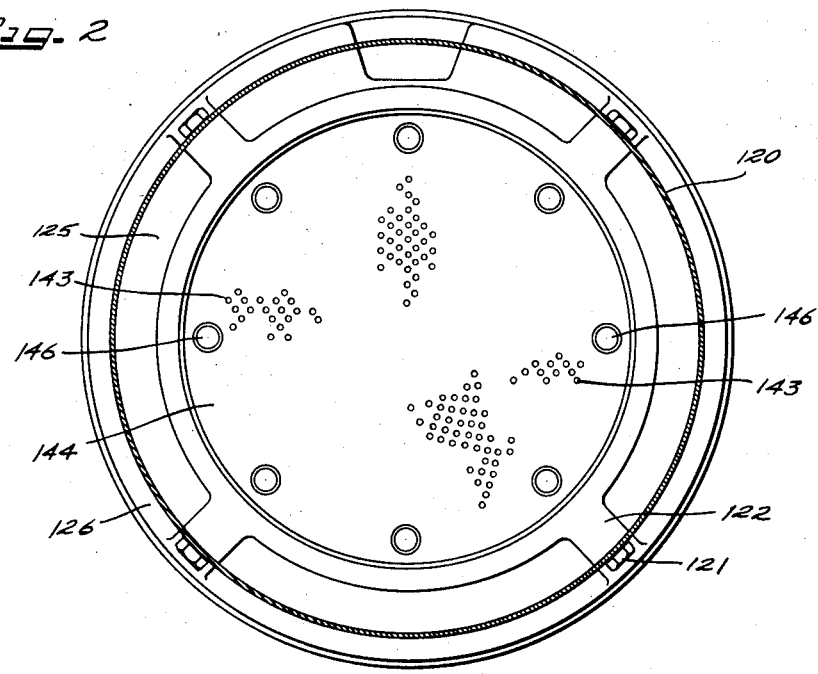
Fig. 2 is an enlarged transverse section, as taken along line 2—2 in Fig. 1.

Since the casing extension 11 is at the head end of the motor unit, the forward opening 12 thereof is protected against direct entrance of foreign matter, by a dome-like shield wall 118 having a cylindrical margin 120 secured, as by bolts 121, and lugs 122 integral with the casing extension 11 externally on its end portion 124. The lugs 122 which may be equally spaced about the casing end portion 124 (Fig. 2), form with the motor surface of the latter a plurality of passages or channels 125 below the shield wall margin 120. The passages open at 126 laterally of the casing extension 11 and communicate at 128 beneath the shield wall, with the casing open end 12, thereby providing liquid admission passages to the forward end of the motor unit.

While liquid-circulation will occur through the motor in submerged displacement thereof in the direction of its head end, such circulation is assured in positive manner, by pumping means embodied in and operated by the motor shaft 30. As shown in Fig. 1, the shaft end portion 31 is provided with an axial bore 129 which is open at 130 in the shaft end face 32, and terminates at 132 in the shaft inwardly beyond the zone of shaft shoulder 47. One or more radial shaft bores 133 (two being shown) extend from communication with bore 129 adjacent its inner end 132, to the shaft surface at openings 134 located between shaft shoulder 47 and the adjacent end 136 of the motor rotor 36. The radial bores serve during shaft rotation, as centrifugal pump passages having suction intake through axial bore 129 and affording pressure discharge through the shaft openings 134. The shaft embodied pumping means is here utilized not only for inducing positive circulation through the motor from end to end thereof, but for effecting force flow into and longitudinally through the motor gap 40. To such end, there is provided a cylindrical wall or baffle member 137 in spaced surrounding relation to the shaft portion having the pump discharge openings 134 therein. The baffle has one end 138 in sleeved support on the bearing housing 42, and its opposite end 140 in abutment with the end portion 141 of the stator assembly 24 near the gap 40. Such baffle serves to direct the pressure discharge from shaft openings 134 axially to and through the gap 40, and also to the adjacent axial thrust bearing for circulation in lubricating and cooling relation to the bearing. Moreover, one or more openings 142 are or may be provided in the baffle 137 for pressure flow therethrough to the stator windings and stator core slots.

Completing the present motor structure are a number of screening elements extending transversely of the motor casing at desired points therein, these being provided for excluding foreign matter from the motor interior. As shown here, one such screen element is the screen wall 144 located inwardly near the casing open end 12. Screen 144 comprises a substantially rigid metal disc which is perforated to provide a multiplicity of relatively small screening openings 143 (Fig. 2), and is marginally secured to an internal flange 145 of casing extension 11, as by suitable bolts 146. Within casing extension 11 is a second screen 148 of like rigid metal, having its margin secured by bolts 149 to the flange 18 of bearing support 16. The perforated body of this screen wall is angulate, as shown, to extend in adjacently spaced relation to and over the liquid passages 78 of the bearing support and the open end 130 of shaft bore 129. A third perforated screen wall 150 of like rigid metal, is located at the open end of casing extension 14, being marginally secured by bolts 152 to an internal flange 153 of the casing extension. This screen is of annular disc form, providing a central opening 154 to accommodate the projection portion 35 of motor shaft 30.

In the operation of the motor as now described, upon initial submergence of the motor in a body of liquid, such as sea water, it will become flooded by entrance of liquid through the passages 125 and the open end 12 of the casing, through the opposite open end 15 of the casing, and through the side passages 79 and 82. As before indicated, the side passages 79 and 82 facilitate draining of liquid from the motor interior when the motor is removed from submergence and elevated from the body of liquid. Now, with the motor submerged and in running condition, liquid circulation will occur through the motor as a result of the pumping action of the shaft operated pumping means comprising the axial and radial shaft bores 129 and 133. Such pump effected circulation normally is entirely sufficient for motor cooling purposes, including lubrication and cooling of the motor bearings, whether the motor is stationary or in displacement in its submerged condition. The circulation will be augmented, however, as a consequence of motor displacement forwardly in the direction of its head end, as the end thereof protectively covered by the dome shape shield wall 118.

In response primarily to the action of the shaft pump means and secondarily to forward motor displacement, liquid will be drawn in through the lateral head end passages 125, beneath dome wall 118 and into the motor casing extension 11 through screen wall 144. The liquid flow thence is through screen wall 148 to passage in part through the bearing support openings or passages 78 into casing chamber 90, in part to and through the shaft pump bores 129 and 133, and in further part to and between the shaft bearing elements 44—66. Liquid under pressure discharge from the shaft openings 134 and guided by baffle 137, passes to and through the motor gap 40 and into the opposite casing chamber 94, with a part of the discharge going to and inwardly through the radial passages 62 in the thrust bearing element 56, into the annular passage 60 and thence to and outwardly between the thrust bearing elements 54—56 for lubricating and cooling the latter. Liquid passing between the radial bearing elements 44—46 in lubricating and cooling relation thereto, enters passage 60, adding to the liquid entering therein through radial passages 62. Also, some part of the pressure discharge will flow through baffle openings 142 into casing chamber 90. The liquid in chamber 90 circulates in cooling relation to and about the field winding end turn groups 87 and 88 and to and through the stator core winding slots 86 about the windings therein, and exits into the opposite casing chamber 94. Liquid circulation in chamber 94 is, in part, to and through the rdaial passages 75 of thrust bearing support 72, into passage 76 for flow in part to and outwardly between the thrust bearing elements 68—72, and in part to and between the radial bearing elements 66—67, as for lubrication and cooling these bearings. Circulation flow in chamber 94 also is about the end turn groups 91—92 and through baffle passage 98 about bearing housing 63. From chamber 94, the circulation continues through bearing support passages 80 and passes with liquid exiting from between the radial bearing elements 66—67 to and through the screen wall 150 and out through the open end 15 of the motor casing. While the major discharge from chamber 94 is as above described, discharge flow will occur to some degree, to and laterally outwardly of the casing through the side openings 82.

It will appear now from the foregoing description, that the present invention affords a submersible dynamoelectric machine of open character, provided for internal flooding by the liquid, as sea water, for example, in which the motor is submerged, and the circulation of such liquid entirely through the motor unit in cooling relation to the motor parts and in cooling and lubricating relation to the motor bearings. It is to be noted that the present machine, shown as an induction motor assembly, provides an axial thrust bearing at each side of the motor rotor, these bearings acting oppositely such that one absorbs the thrust in one direction and the other absorbs the thrust in the opposite direction. Consequently, the rotor is thereby thrust supported in any position of the motor, whether such position be horizontal, vertical or at any intermediate inclination. Also, the opposed thrust bearing provisions afford the above character of rotor support not only in respect of physical positions of the machine but as to the drive reaction thrust in either direction of rotor rotation. This last is of practical advantage where the machine is adapted for ready reversal of rotation, as where such is desirable or necessary in its operating or drive function relative to the apparatus to be operated or driven thereby.

Having now illustrated and described the invention in respect to a presently preferred embodiment thereof, it is to be understood that the machine may be variously modified in structure and relation of its parts, all without departing from the spirit and scope of the invention as hereinafter claimed.

What is claimed is:

1. A dynamoelectric machine provided for operation submerged in a body of liquid, comprising in combination, a casing having opposite open ends, a stator in the casing, a shaft extending in the casing, a rotor on the shaft in cooperation with the stator, bearing means operatively supporting the shaft in the casing, a shield carried by the casing in overlying relation to one open end thereof, ambient liquid inlet passage means in the casing opening laterally thereof and communicating with said one open end of the casing beneath said shield, and said bearing means having liquid passage means therein, the machine in initial submergence being internally flooded by liquid entering through said inlet passage means and the other open end of the casing, and in submerged operation having liquid circulation therethrough, wherein ambient liquid enters through said inlet passage means to and through said one open end of the casing, passing therein and through the bearing passage means, over and between the stator and rotor, and out through the other open end of the casing.

2. A dynamoelectric machine provided for operation submerged in a body of liquid, comprising in combination, a generally tubular casing having its opposite ends each provided with an opening therein, a stator supported in the casing, a shaft extending longitudinally in the casing, a rotor on the shaft positioned for cooperation with said stator, first shaft supporting bearing means carried by the casing near one end thereof, second shaft supporting bearing means carried by the casing near the other end thereof, a shield on said casing in overlying relation to said one casing end and the opening therein, liquid inlet passage means in the casing opening laterally thereof and communicating with the opening in said one end of the casing beneath said shield, and said first and second bearing means having liquid passage means therein, the machine in initial submergence being internally flooded by liquid entering through said inlet passage means and the opening in the other end of the casing, and in submerged operation having liquid circulation therethrough, wherein liquid enters through said inlet passage means to and through the opening in said one end of the casing, passing in the casing and through the passage means of said first bearing means, about and between the stator and rotor, through the passage means in said second bearing means and to discharge through the opening in said other end of the casing.

3. A dynamoelectric machine provided for operation submerged in a body of liquid, comprising in combination, a generally tubular casing open at its opposite ends, a stator in said casing and providing electrical windings having liquid impervious insulation, a shaft extending longitudinally in the casing, a rotor on the shaft in cooperation with the stator, first shaft bearing means including a bearing support connected to the casing near one open end of the latter, second shaft bearing means including a bearing support connected to the casing near the other open end thereof, a wall element carried by the casing in shielding relation to said one open end thereof, liquid inlet passage means in the casing opening laterally thereof and communicating with said one end of the casing beneath said wall element, and a plurality of liquid passages through each of said bearing supports, the machine in initial submergence being internally flooded by liquid entering through said inlet passage means and the other open end of the casing, and in submerged operation having liquid circulation therethrough, wherein ambient liquid enters through said passage means to and through said one open end of the casing, passing therein and through the liquid passages in the bearing support of said first bearing means, to and about said windings and between the stator and rotor, and through the liquid passages in the bearing support of said second bearing means to discharge through said other open end of the casing.

4. A dynamoelectric machine as defined by claim 3, characterized further by a perforated screen-wall carried by the said casing over the said one open end thereof.

5. A dynamoelectric machine provided for operation submerged in a body of liquid, comprising in combination, a generally tubular casing open at its ends, a stator in the casing and providing electrical windings having liquid impervious insulation, a shaft extending longitudinally in the casing, a rotor on the shaft in cooperation with the stator, bearing means carried by the casing adjacent each open end of the latter and operatively supporting said shaft, each bearing means including liquid passages therein, a wall element on the casing in shielding relation to one open end of the casing, casing inlet passage means open to the casing exterior and communicating with said one open end of the casing beneath said wall element, for the admission of liquid into the casing in the submerged condition of the machine, a first perforated screen-wall over said one open end of the casing, and a second perforated screen-wall over the other open end of the casing, the machine in initial submergence being internally flooded by liquid entering through said inlet passage means and the other open end of the casing, and in submerged operating having liquid circulation therethrough, wherein ambient liquid enters said inlet passage means to and through said screen-wall to the casing interior and through the liquid passages of the bearing means adjacent said one open end of the casing, for flow about said windings and between the stator and rotor, thence through the liquid passages of the bearing means adjacent the other open end of the casing, to and through said second screen-wall to discharge beyond said other open end of the casing.

6. A dynamoelectric machine provided for operation submerged in a body of liquid, comprising in combination, a generally tubular casing open at its opposite ends, a stator in the casing and including electrical windings having liquid impervious insulation, a shaft extending longitudinally in the casing and having one end portion thereof terminating in an end face adjacent one open end of the casing, a rotor on the shaft in cooperation with the stator and forming therewith a gap, first bearing means having a bearing support connected to the casing near said one open end thereof and operatively supporting one end portion of the shaft, second bearing means having a bearing support connected to the casing near its other open end and operatively supporting the shaft in the portion thereof adjacent said other open end of the casing, each of said bearing supports having liquid passages therethrough, said shaft having an axial bore therein opening at said shaft end face and a transverse bore communicating with the axial bore and opening laterally of the shaft at a point thereof between said first bearing means and the rotor, a shield member on the casing in spaced, overlying relation to said one open end of the casing, and inlet passage means in the casing opening laterally thereof and communicating with said one open end of the casing beneath said shield member, the machine in initial submergence being internally flooded by liquid entering the casing through said inlet passage means and the other open end of the casing, and in submerged operation having liquid circulation therethrough, wherein liquid enters through said inlet passage means to and through said open end of the casing, passes in part through the liquid passages in the bearing support of said first bearing means and in part through said axial and transverse shaft bores, to and over the said windings and through said gap between the rotor and stator, and thence through the liquid passages in the bearing support of said second bearing means to discharge through said other open end of the casing.

7. A dynamoelectric machine in accordance with claim 6, further characterized by baffle means between the said stator and the said first bearing means, serving to direct the liquid passing through the said axial and transverse shaft bores for flow to and through the said gap.

8. A dynamoelectric machine provided for operation submerged in a body of liquid, comprising in combination, a casing having opposite open ends, a stator in the casing, a shaft extending in the casing, a rotor on the shaft for cooperation with said stator, the shaft having opposite end portions projecting beyond the rotor, shaft supporting bearing means for each of said shaft end portions, each said bearing means comprising a bearing support carried by the casing, a radial bearing between the support and the associated shaft end portion, and an axial thrust bearing between the associated shaft end portion and said support, said bearing supports having liquid passages therethrough, a shield member on the casing and extending over one open end thereof, and said casing providing inlet passage means opening laterally thereof and communicating with said one open end beneath said shield member, the machine in initial submergence being internally flooded by liquid entering the casing through said inlet passage means and the other open end of the casing, and in submerged operation having liquid circulation therethrough, wherein liquid enters through said inlet passage means to said one open end of the casing, passes through the liquid passages of one bearing support and in lubricating relation to the radial and axial thrust bearings of said one bearing support, to and between said stator and rotor, thence flows in lubricating relation to the radial and axial thrust bearings of the other bearing support and through the liquid passages of the latter, to and through the other open end of the casing.

9. A dynamoelectric machine provided for operation submerged in a body of liquid, comprising in combination, a tubular casing having opposite open ends, an annular stator in the casing, a rotary shaft longitudinally in the casing through the stator, a rotor on the shaft in cooperation with the stator and forming therewith an annular gap, radial and axial thrust bearings in the casing operatively supporting the shaft therein, a shield wall on the casing and extending in spaced overlying relation to one open end of the casing, casing passage means open to the casing exterior and communicating with said one end of the casing beneath said shield wall, and said shaft providing pumping means operable thereby and having a discharge outlet adjacent one end of said gap, the machine in initial submergence being internally flooded by liquid entering the casing and through said passage means and the other open end of the casing, and in submerged operation having liquid circulation therethrough, wherein liquid enters through said casing passage means and beneath said shield wall to and through said one open end of the casing, and passes in the casing about the stator and through said gap and in liquid lubricating relation to said radial and axial thrust bearings, and out through the other open end of the casing, said pumping means providing pressure discharge of liquid adjacent said one end of the gap for pressure flow thereof longitudinally through the gap in the direction of liquid circulation through the casing.

References Cited in the file of this patent

UNITED STATES PATENTS

| | | |
|---|---|---|
| 1,575,819 | Carrier | Mar. 9, 1926 |
| 2,002,916 | Mendenhall et al. | May 28, 1935 |
| 2,568,548 | Howard et al. | Sept. 18, 1951 |
| 2,772,373 | Howe | Nov. 27, 1956 |
| 2,786,952 | Pleuger | Mar. 26, 1957 |